United States Patent Office 3,198,783
Patented Aug. 3, 1965

3,198,783
AZOPYRAZOLONE DYES FOR POLYESTER FIBERS
Charles E. Lewis, Somerville, N.J., assignor to American Cyanamid Company, New York, N.Y., a corporation of Maine
No Drawing. Filed Aug. 8, 1961, Ser. No. 129,998
3 Claims. (Cl. 260—163)

This invention relates to arylazopyrazolone dyes for polyester fibers and polyester fibers dyed therewith. More particularly this invention relates to dyes of the formula I:

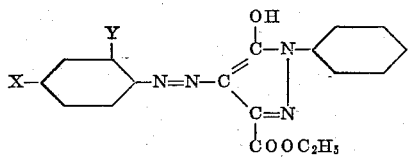

wherein X and Y are selected from the group consisting of nitro and chloro and are not the same. These dyes color conventional polyester fibers derived from terephthalic acid, yellow shades of good color value and fastness to light.

Polyester fibers are only difficultly dyed, there being only few dyes known which are fully suitable for this purpose. Acid and direct dyes have no affinity whatsoever for this type of fiber. While acetate dyes have some affinity, they tend to have poor light fastness and are usually undesirable. There is, thus, a need for dyes which possess good light fastness on, and good affinity for, polyester fibers.

Heretofore, arylazopyrazolone dyes of the type in Formula I have been used primarily in the dyeing of wool, silk, acetate and nylon. Known arylazopyrazolones have very little affinity for polyester materials and are deficient in light fastness.

It is an object of this invention to provide new dyestuffs of the arylazopyrazolone class which are useful in coloring polyester fibers. Other objects will be made hereinafter apparent.

In accordance with this invention it has been found that the new arylazopyrazolone dyestuffs of Formula I surprisingly have pronounced affinity for polyester fibers. It is surprising that, whereas arylazopyrazolone dyestuffs are normally used for dyeing wool, the two specific dyestuffs of the present invention leave wool white even when it is subjected to the same dyeing conditions along with polyester fibers. The latter under the same conditions are dyed a strong yellow color. The dyes do not sublime off the fiber even at the high temperatures encountered in pressing operations, are fast to light, to the AATCC wash test #3, and to crocking.

The dyes of this invention may be prepared by coupling diazotized 2-chloro-4-nitroaniline or 4-chloro-2-nitroaniline to 1-phenyl-3-carboethoxy-5-pyrazolone by the usual methods, according to the equation:

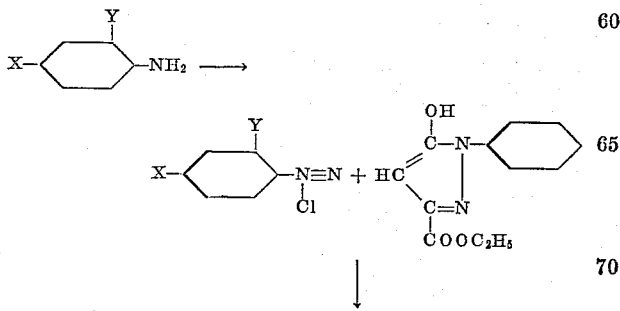

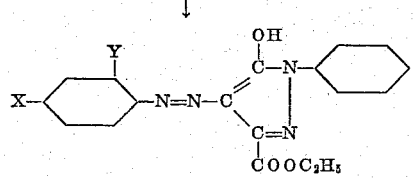

The dyes of this invention are of the disperse type and may be dyed on polyester fibers in an aqueous bath using a carrier such as o-phenylphenol or, preferably a methyl salicylate emulsion of the type described and claimed in U.S. 2,881,045. Excellent yellow shades and complete exhaust are produced by dyeing for one hour at 200° F.

It is an advantage of the compounds of this invention that wool-polyester mixtures may be dyed in two-tone effects. Thus, when polyesters are dyed by the usual methods, the wool is white and may be left as such or pre-dyed or post dyed another color. Another advantage of polyesters dyed by the present invention is that when colors do eventually fade after prolonged exposure, the fading is on tone. This is in contrast to the conventionally used polyester yellow dye (i.e., 2-nitrophenyl-amine-4-sulfonanilide) which fades off tone to a brown color.

The following examples in which parts are by weight unless otherwise noted, are presented to further illustrate the present invention.

Example 1

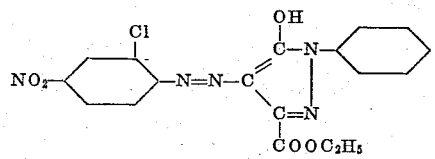

Into 30 parts by volume of cold conc. sulfuric acid at a temperature just below 0° C. is sifted 2.1 parts of sodium nitrite. The mixture is stirred until a solution is obtained. Then 5.18 parts of 2-chloro-4-nitroaniline is added gradually and the mixture stirred for a short time (30 min.). The mixture is then drowned into 250 parts of ice water, and after stirring, filtered through a filter aid to clarify the solution of diazo.

6.96 parts of 1-phenyl-3-carbethoxy-5-pyrazolone is dissolved in 200 parts of ice water with 40 parts by volume of 5 N sodium hydroxide. The diazo solution prepared above is added gradually. 5 N sodium hydroxide is added as necessary to keep the reaction alkaline. When all of the solution of diazo has been added, the mixture is stirred for a short time (30 min.) and then sufficient sodium acetate added to achieve a pH of 4–5. After further stirring, the product is isolated by filtration and washed with cold water. It is recrystallized from alcohol-pyridine.

Example 2

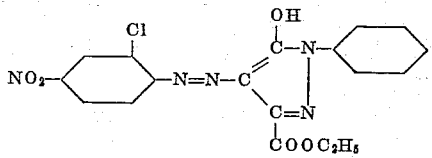

6.32 parts of 2-chloro-4-nitroaniline is pasted with water and made alkaline to Brilliant Yellow indicator paper with dilute sodium hydroxide solution. Then 2.80 parts of sodium nitrite are added and the mixture diluted to 150 cc. The temperature is adjusted to 0–5° C. Then 50 parts by volume of 20% hydrochloric acid is added rapidly, the temperature being kept below 5° C. The mixture is stirred for one hour. Sulfamic acid is added as necessary to destroy excess nitrous acid. The solution of diazo is clarified by filtration.

9.28 parts of 1-phenyl-3-carboethoxy-pyrazolone-5 are dissolved in 250 parts of ice water with 10 parts by volume of 20% sodium hydroxide solution and 70 parts by volume of 20% sodium carbonate solution. The solution is iced to 0° C. and the solution of diazo added gradually. Sodium hydroxide solution is added as necessary to keep the coupling mixture alkaline. The product is isolated by filtration and reslurried in water. It is made acid to Congo red indicator paper by the addition of 20% hydrochloric acid solution. It is filtered and washed with water and dried in a vacuum oven.

*Example 3*

Ground together and then fused, are:

25 mg. of the product of Example 1,
250 mg. of Renex 25, a polyoxyethylene ester of mixed fatty and resin acids and
125 mg. of sodium lauryl sulfate.

To the mixture 25 cc. water are added and the mixture broken up and boiled. It is then made up to 200 ml. with water. A five-gram skein of polyethylene terephthalate is added. To the bath is then added three grams of a methyl salicylate emulsion and the dyebath heated to 200° F. and held there for one hour. The skein is then removed, rinsed in hot and in cold water. It is then boiled in a solution containing 0.01% neutral soap and 0.1% sodium carbonate, rinsed in hot water and in cold water and dried.

It dyes the polyester skein a reddish yellow hue of good strength and excellent fastness to light, rating 7-8.

When a sample of the skein is pressed between a piece of white polyester fabric and white cotton piece goods for ten seconds at 360° F., it leaves the piece goods white. No staining occurs. Thus it shows no sublimation and is resistant to hot pressing.

*Example 4*

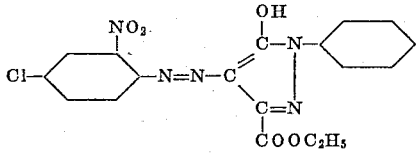

3.16 parts of 4-chloro-2-nitroaniline is added to 20 parts by volume of concentrated sulfuric acid containing 1.4 parts of sodium nitrite at 10° C. and stirred until all is dissolved. The mixture is drowned on ice and the insolubles removed by filtration. The solution of diazo is added gradually to a solution prepared by: dissolving 4.6 parts of 1-phenyl-3-carboethoxypyrazolone-5 in 200 parts by volume of ice water containing 20 parts by volume of 20% sodium hydroxide, cooling this to 0° C. and adding 150 parts by volume of 20% sodium hydroxide solution.

When diazo addition is complete, the acidity of the coupling is reduced with sodium acetate to a positive test on Methyl Red Yellow. The product is isolated by filtration and washed with water until free from acid. It is recrystallized from carbitol and dried in vacuum at 80° C.

*Example 5*

When the product of Example 4 is dyed by the method of Example 3 good exhaust occurs and a strong reddish yellow dyeing is obtained which has a light fastness rating of 8. It is a redder yellow than the product of Examples 1 and 2 and is about 50% stronger.

*Example 6*

17.5 mg. of the dye of Example 2 is fused with 175 mg. of Renex 25 and 87.5 mg. of sodium lauryl sulfate. 25 cc. of water is added, the mixture boiled and then made up to 200 ml. with water. Three grams of methyl salicylate emulsion as prepared in Example 1 of U.S. Patent 2,881,045 is added. A fine dispersion is obtained. Then a 5 gram piece of polyester fabric is added and the temperature of the bath raised to 200° F. and held there for one hour. The fabric is removed and rinsed in hot and then in cold water. It is then soaped at the boil for 10 minutes in a solution which is a mixture of 0.1% neutral soap and 0.1% sodium carbonate solution. The piece goods is then given a hot water rinse, followed by a cold water rinse and dried. It is heated for one minute at 360–380° F. A bright reddish yellow dyeing is obtained of good fastness to light.

I claim:

1. A compound of the formula:

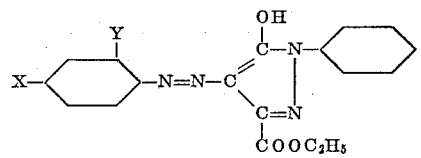

wherein X and Y are selected from the group consisting of nitro and chloro, and are not the same.

2. The compound

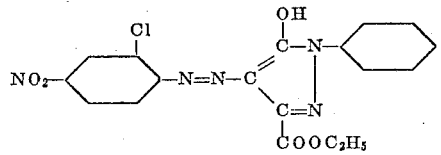

3. The compound

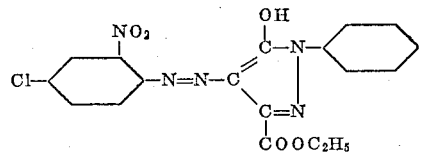

References Cited by the Examiner

UNITED STATES PATENTS

| | | | |
|---|---|---|---|
| 2,330,828 | 10/43 | Lubowe | 8—55 |
| 2,757,064 | 7/56 | Speck | 8—55 |
| 3,019,217 | 1/62 | Joyce | 260—163 |
| 3,068,056 | 12/62 | Coe | 8—55 |

FOREIGN PATENTS

| | | |
|---|---|---|
| 1,198,732 | 6/59 | France. |
| 129,474 | 12/28 | Switzerland. |

CHARLES B. PARKER, *Primary Examiner.*

LEON ZITVER, *Examiner.*